(12) United States Patent
Allegri et al.

(10) Patent No.: US 9,517,518 B2
(45) Date of Patent: Dec. 13, 2016

(54) METHOD OF MANUFACTURING THE THREAD OF A NUT IN A SCREW AND NUT SYSTEM

(71) Applicant: Aktiebolaget SKF, Göteborg (SE)

(72) Inventors: Eric Allegri, Montmelian (FR); Gilles Pajean, Saint Pierre d'Albigny (FR)

(73) Assignee: AKTIEBOLAGET SKF, Gothenburg (SE)

( * ) Notice: Subject to any disclaimer, the term of this patent is extended or adjusted under 35 U.S.C. 154(b) by 341 days.

(21) Appl. No.: 14/067,673

(22) Filed: Oct. 30, 2013

(65) Prior Publication Data

US 2014/0135135 A1 May 15, 2014

(30) Foreign Application Priority Data

Oct. 30, 2012 (FR) ...................................... 12 60369

(51) Int. Cl.
*B23G 5/00* (2006.01)
*B23G 7/00* (2006.01)
*B23G 7/02* (2006.01)

(52) U.S. Cl.
CPC . *B23G 5/00* (2013.01); *B23G 7/00* (2013.01); *B23G 7/02* (2013.01); *B23G 2210/04* (2013.01); *B23G 2240/36* (2013.01)

(58) Field of Classification Search
CPC ............... B23G 5/00; B23G 7/00; B23G 7/02; B23G 2240/36; B23G 2210/04
See application file for complete search history.

(56) References Cited

U.S. PATENT DOCUMENTS

| | | | | |
|---|---|---|---|---|
| 2,703,419 A | * | 3/1955 | Barth | B21H 7/10 29/523 |
| 7,467,577 B2 | * | 12/2008 | Glimpel | B23G 5/06 82/1.11 |
| 7,536,795 B2 | * | 5/2009 | Glimpel | B23G 1/16 33/199 R |
| 2009/0064811 A1 | * | 3/2009 | Shirai | B23C 3/32 74/424.87 |
| 2009/0215544 A1 | * | 8/2009 | Chirico | B23G 7/02 470/199 |
| 2012/0107063 A1 | | 5/2012 | Norimatsu | |

FOREIGN PATENT DOCUMENTS

| | | |
|---|---|---|
| EP | 1616652 A2 | 1/2006 |
| SU | 1090513 A1 | 5/1984 |
| SU | 1637924 A1 | 3/1991 |

* cited by examiner

*Primary Examiner* — Teresa M Ekiert
(74) *Attorney, Agent, or Firm* — Bryan Peckjian; SKF USA Inc. Patent Dept.

(57) ABSTRACT

A method of manufacturing a nut in a screw and nut system comprises a first material removal stage to form an internal thread of which the value of the nominal diameter is lower than a predetermined final nominal diameter value and a second plastic deformation stage of the thread formed during the first stage to obtain the predetermined final value by material displacement.

13 Claims, 3 Drawing Sheets

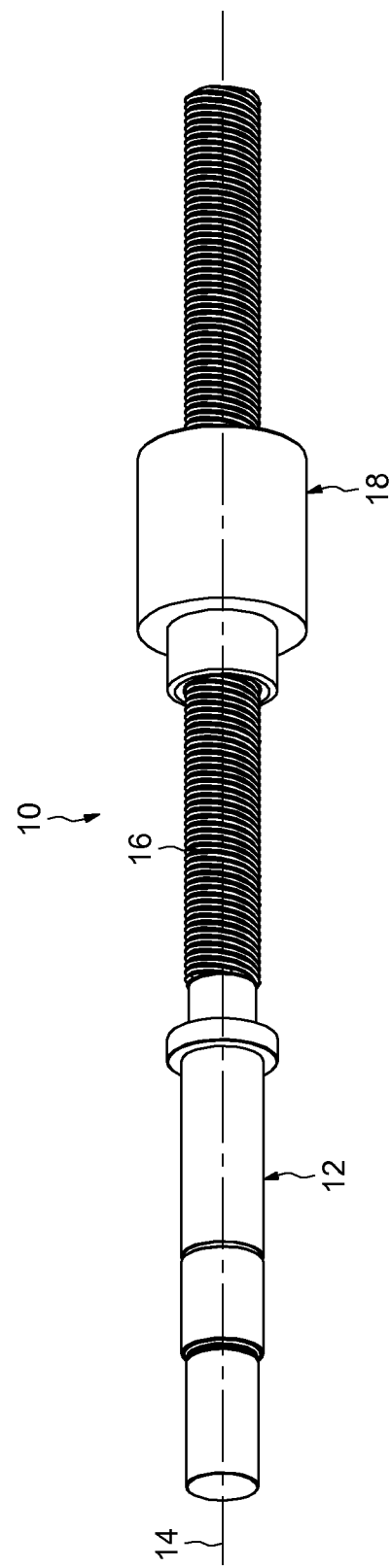

METHOD OF MANUFACTURING THE THREAD OF A NUT IN A SCREW AND NUT SYSTEM

CROSS-REFERENCE

This application claims priority to French Patent Application No. FR1260369 filed on Oct. 30, 2012, the contents of which is fully incorporated herein by reference.

FIELD OF THE INVENTION

The present invention relates to the field of screw and nut-type systems allowing a rotational motion to be transformed into a linear translating motion, and vice versa. The present invention relates more particularly to a method of manufacturing the thread of the nut in such a system.

SUMMARY OF THE INVENTION

A screw and nut system is provided with a screw comprising an external thread, a nut disposed about the screw and comprising an internal thread and a plurality of rolling components engaging the external and internal threads of the screw and of the nut. The rolling components may be balls or rollers. The main advantage of a roller system by comparison with a ball system is that it has the capacity for higher permissible loads.

In order to obtain the thread of the nut in such a system, material removal stages involving turning and milling are generally provided for. With such machining operations, however, the surface finishes of the nut thread may be at odds with achieving greater efficiency for the screw and nut system, particularly with a small-sized system. In order to overcome this drawback, it is possible to provide for a grinding or resurfacing stage of the nut thread in addition to the machining stages. Such a resurfacing operation is relatively costly, however.

The object of the present invention is to overcome these drawbacks.

SUMMARY OF THE INVENTION

More particularly, the object of the present invention is to provide a method of manufacturing a nut in a screw and nut system which allows surface finishes suited to achieving greater efficiency of the associated system to be obtained in an economic way.

In one embodiment, the method of manufacturing the thread of a nut in a screw and nut system comprising a screw provided with an external thread, a nut disposed about the screw coaxially thereto and provided with the internal thread and a plurality of rolling components interposed between the threads of the screw and the nut, comprises a first material removal stage to form an internal thread of which the value of the nominal diameter is lower than a predetermined final nominal diameter value and a second plastic deformation stage of the thread formed during the first stage to obtain the predetermined final nominal diameter value by material displacement.

Advantageously, the nut thread is formed during the first material removal stage so as to obtain a nominal diameter value 10 µm to 100 µm, preferably 20 µm to 50 µm, lower than the predetermined final nominal diameter value.

In a preferred embodiment, the nut thread is deformed plastically by deformation tapping.

In one embodiment, a groove is formed on the nut thread during the first material removal stage. The groove may be formed at the bottom of the nut thread. Alternatively or in conjunction, a chamfer is created at the vertex of the nut thread during the first material removal stage.

The invention likewise relates to a deformation tap comprising a shaft and a threaded part comprising a tapered deformation zone and a cylindrical calibration zone extending the large-diameter portion of the deformation zone. The tap may comprise a cylindrical tap centring zone at the end of the tap on the side of the tapered deformation zone.

BRIEF DESCRIPTION OF THE DRAWINGS

The present invention will be easier to understand after reading the detailed description of a realization and an embodiment by way of examples which are in no way limiting and are illustrated by the attached drawings in which:

FIG. 1 is a perspective view of a screw and nut system,

DETAILED DESCRIPTION OF THE INVENTION

Figure 3:
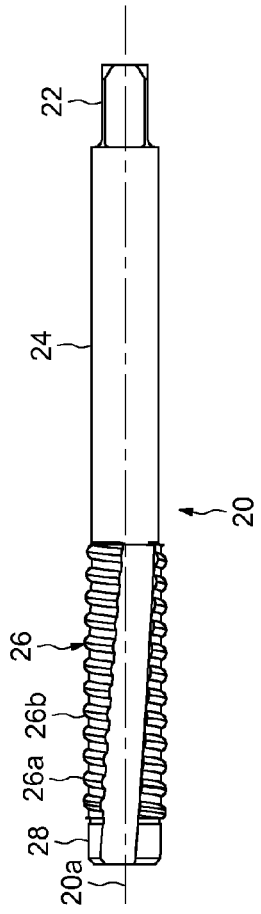
FIGS. 2 and 3 are perspective and side views of a tap device according to an exemplary embodiment of the invention.

In FIG. 1, a screw and nut system, reference number 10 in its entirety, comprises a screw 12 with an axis 14, provided with an external thread 16, a nut 18 mounted coaxially about the screw 12 and provided with an internal thread, the internal diameter of which is greater than the external diameter of the external thread 16, and a plurality of rolling components (not shown) disposed radially between the screw and the nut. The rolling components may be longitudinal rollers or balls. The screw 12 extends longitudinally through a cylindrical bore in the nut 18 on which the internal thread of the nut is formed.

Figure 2:
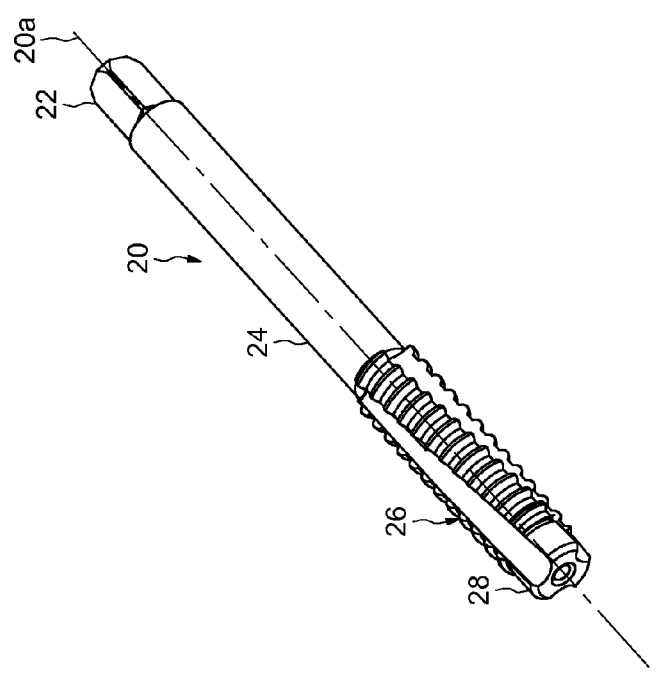

As will be described in greater detail below, a deformation tap such as that illustrated in FIGS. 2 and 3 is particularly used in the manufacture of the internal thread of the nut 18. The tap reference number 20 with an axis 20a comprises a square drive 22, a cylindrical shaft 24, a threaded part 26 and a cylindrical portion 28 with an end extending the threaded part. The threaded part 26 comprises three segments here spaced evenly apart from one another in the circumferential direction and forming lobes. The presence of the lobes reduces the contact surface between the threaded part 26 of the tap and the bore of the nut, so as to allow plastic deformation of the material of the nut without the removal of material.

The threaded part 26 comprises a tapered deformation zone 26a, the small-diameter portion of which axially extends the end cylindrical portion 28 forming the tap centring portion. The threaded part 26 likewise comprises a cylindrical calibration zone 26b axially extending the large-diameter portion of the deformation zone 26a and joining up with the cylindrical shaft 24. The deformation zone 26a may be equal in length to twice the thread pitch of the threaded part 26, for example.

Figure 5:
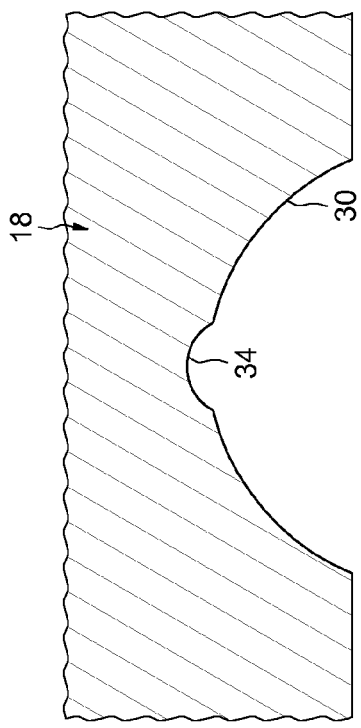
FIG. 5 is a partial sectional view illustrating the nut thread at different stages in the manufacturing process and FIGS. 6 to 8 are partial sectional views illustrating the nut thread according to different exemplary embodiments of the process.

To proceed with the manufacture of the internal thread of the nut 18, the following method is used. At a first stage, an intermediate internal thread 30 (FIG. 5) is formed by removing material, the nominal diameter value of the thread being lower than a final predetermined nominal diameter value which corresponds to the value to be obtained for the final internal thread 32 of the nut for the purpose of its operation within the screw and nut system. The intermediate thread 30 of the nut is advantageously formed so as to obtain an allowance on the material thickness referred to as e in relation to the predetermined final value, the allowance being between 10 μm and 100 μm, and preferably included between 20 μm and 50 μm.

Figure 4:
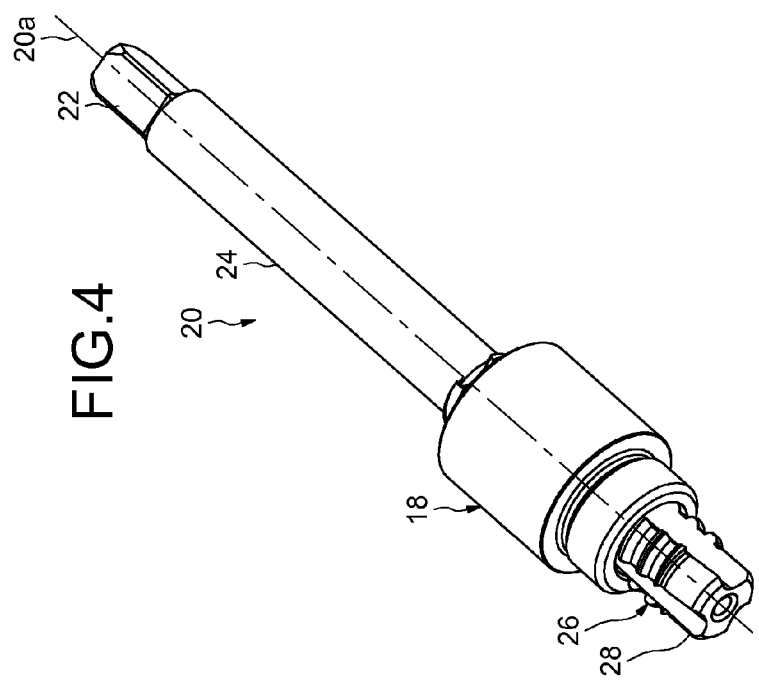
FIG. 4 is a perspective view illustrating a stage in a manufacturing process of the nut thread in the system of FIG. 1 according to an exemplary embodiment of the invention.

Next, during a second stage, the thread 30 obtained during the first stage is plastically deformed to attain the final predetermined nominal diameter value by material displacement and thereby obtain the final thread 32. In order to proceed to the plastic deformation of the intermediate thread 30, the deformation tap 20 is used. The cylindrical end portion 28 of the tap is initially introduced into the bore of the nut 18. The threaded part 26 of the tap is then introduced into the bore of the nut 18, as illustrated in FIG. 4, so as to deform the intermediate thread 30 obtained earlier during the first stage over its entire length. During this second stage of the process, the tap 20 pushes away or displaces the material, so that it runs in radial, axial and circumferential directions, in order to obtain the final predetermined nominal diameter value and the final thread 32 from the intermediate thread 30.

Figure 6:
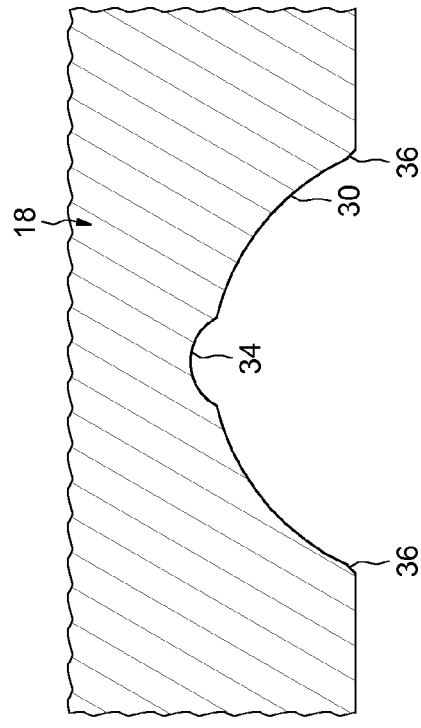
Figure 7:
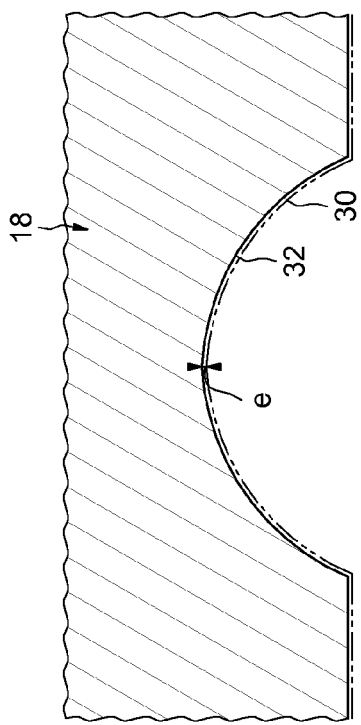
Figure 8:
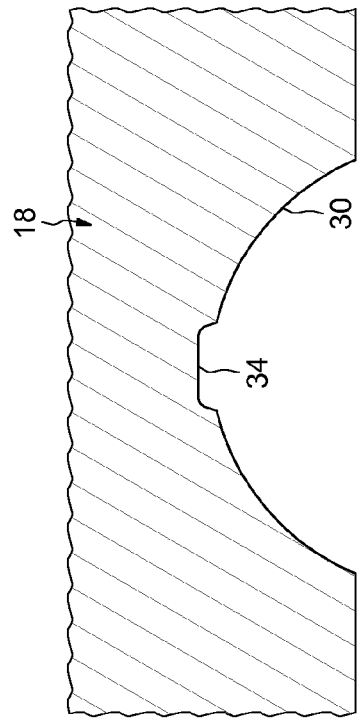

As illustrated in FIG. 6, in order to facilitate the subsequent plastic flow of the material of the intermediate thread 30, it is possible to provide for the formation of a groove 34 formed at the bottom of the thread and directed radially inwards during the first material removal stage. The groove 34 forms a zone in which the material of the intermediate thread 30 can then be freely displaced during the second subsequent plastic deformation stage. In the exemplary embodiment shown, the groove 34 exhibits a profile in circular arc form in a straight section. Alternatively, it is of course possible to provide for other profiles for the groove 34, for example a rectangular profile as illustrated in FIG. 7. In order to facilitate the plastic flow of the material of the intermediate thread 30, it is likewise possible in addition to provide a chamfer 36, as illustrated in FIG. 8, at each vertex of the thread.

In the exemplary embodiment described, the plastic deformation of the intermediate thread 30 of the nut is obtained by deformation tapping. Alternatively, it may be possible to obtain this plastic deformation using other techniques, for example by rolling balls on the internal thread of the nut or also by using a tool comprising a finger resting against the thread.

The end thread of the nut is obtained through a material removal stage followed by a deformation stage of the thread blank formed without the removal of material. With such a manufacturing process, the internal thread of the nut displays surface finishes close to those obtained following correction stages. Moreover, the mechanical resistance of the internal thread is increased by the plastic deformation stage. A nut allowing the efficiency and service life of the associated screw and nut system to be enhanced is thereby obtained.

The invention claimed is:

1. A method of manufacturing an internal thread of a nut configured to be used in a screw-and-nut system, the method comprising:
forming the internal thread in the nut with a material removal stage, a nominal diameter value of the internal thread being less than a predetermined final nominal diameter value, and
after forming the internal thread, during a plastic deformation stage, displacing material of the internal thread formed during the material removal stage to obtain the predetermined final nominal diameter value,
the method including forming a groove on the internal thread during the material removal stage.

2. The method according to claim 1, wherein the nominal diameter value is less than the predefined final nominal diameter value by 10 μm to 100 μm.

3. The method according to claim 2, wherein the nominal diameter value is less than the predefined final nominal diameter value by 20 μm to 50 μm.

4. The method according to claim 1, wherein displacing material of the internal thread comprises deformation tapping.

5. The method according to claim 1, wherein the groove is formed at the bottom of the internal thread.

6. The method according to claim 1, including creating a chamfer at a vertex of the internal thread during the material removal stage.

7. A method of manufacturing an internal thread of a nut configured to be used in a screw-and-nut system, the method comprising:
forming an internal thread having a nominal diameter in the nut by removing material from an inner wall of the nut, and
after forming the internal thread, increasing the nominal diameter of the internal thread by plastic deformation of the internal thread without removing material from the inner wall of the nut,
the method including forming a groove in a surface of the internal thread.

8. The method according to claim 7, wherein increasing the nominal diameter of the internal thread comprises increasing the nominal diameter of the internal thread by 10 μm to 100 μm.

9. The method according to claim 7, wherein increasing the nominal diameter of the internal thread comprises increasing the nominal diameter of the internal thread by 20 μm to 50 μm.

10. The method according to claim 7, wherein forming a groove in a surface of the internal thread comprises forming the groove at a bottom of the internal thread.

11. The method according to claim 7, wherein increasing the nominal diameter of the internal thread includes deforming the groove.

12. A method of manufacturing an internal thread of a nut configured to be used in a screw-and-nut system, the method comprising:
forming an internal thread having a nominal diameter in the nut by removing material from an inner wall of the nut, and
after forming the internal thread, increasing the nominal diameter of the internal thread by plastic deformation of the internal thread without removing material from the inner wall of the nut, the method including forming a chamfer at a vertex of the internal thread and wherein increasing the nominal diameter of the internal thread incudes deforming the chamfer.

13. The method according to claim 12, including forming a groove in a surface of the internal thread and wherein increasing the nominal diameter of the internal thread includes deforming the groove.

\* \* \* \* \*